June 5, 1923.
J. C. MISNER
OIL BURNER
Filed Sept. 3, 1920
1,457,590
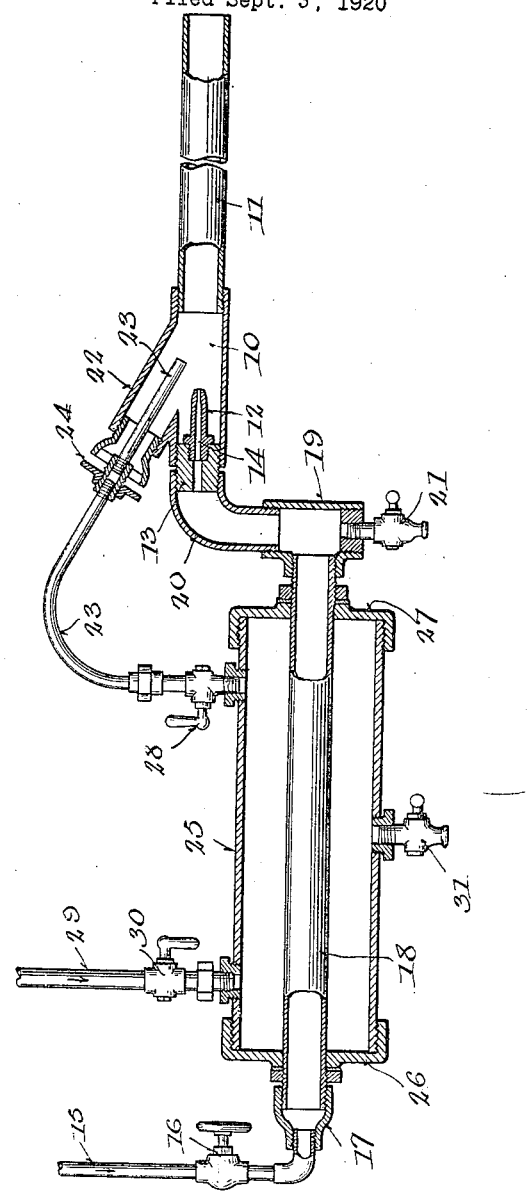
Julius C. Misner
INVENTOR.
BY
Herbert E. Joelle
ATTORNEY.

Patented June 5, 1923.

1,457,590

UNITED STATES PATENT OFFICE.

JULIUS C. MISNER, OF TERRE HAUTE, INDIANA.

OIL BURNER.

Application filed September 3, 1920. Serial No. 408,027.

*To all whom it may concern:*

Be it known that I, JULIUS C. MISNER, a citizen of the United States, residing at Terre Haute, in the county of Vigo and State of Indiana, have invented a certain new and useful Improvement in Oil Burners, of which the following is a full, clear, concise, and exact description, reference being had to the accompanying drawings, forming a part of this specification.

This invention relates to oil burners.

The general aim of the invention is the provision of an improved burner capable of use with any kind of liquid fuel and so constructed as to effect a perfect combustion thereof.

With this end in view, provision is made for delivering the fuel and atmospheric air into a blast of heated gas, preferably steam, by which the fuel is completely atomized and thoroughly and intimately mixed with the air and hot gas. It has been found, especially when the heavier or more viscous fuels are employed, that the best results are obtained when the fuel has been heated prior to its admission to the blast of hot gas.

Another more specific object is therefore the provision of a burner of the character referred to in which the fuel is heated before it is mixed with the other constituents that go to make up the inflammable mixture.

Another object is the provision of a simple, inexpensive and efficient burner of such construction that it cannot readily become clogged and such that it may be easily dismantled for purposes of cleaning or repair.

Other objects and advantages will hereinafter appear.

One embodiment of the invention is shown in section in the accompanying drawing.

The burner illustrated in the drawing includes a mixing chamber 10 communicating with a burner pipe 11. The outer end of pipe 11 may be open or may be provided with or fashioned to form a burner piece of any standard or approved type.

A blast of hot gas, such, for instance, as steam, is directed into and through the mixing chamber and burner pipe through a nozzle 12. The nozzle 12 is mounted in a suitable bushing 13 fixed into the end 14 of the mixing chamber 10. Pipe 15 is connected with any convenient source of steam supply and is provided with a throttle valve 16 of any appropriate type. When the valve 16 is open, communication is established between the pipe 15 and nozzle 12 through a coupling 17, feed pipe 18, T fitting 19 and elbow 20. The T fitting 19 is preferably vertically arranged so that its lower branch forms a trap for condensed steam, a drain cock 21 being provided therein for drawing off the water of condensation.

Atmospheric air is admitted to the mixing chamber 10 through a Y branch 22 preferably formed integral therewith and liquid fuel is admitted preferably through a tube 23 extending through the branch 22 and substantially into the mixing chamber. An air regulating valve 24 is preferably adjustably mounted on the tube 23 adjacent the outer end of branch 22 for controlling the admission of air to the mixing chamber.

As above pointed out, the liquid fuel is preferably heated before its admission to the mixing chamber. For this purpose, a heating chamber 25 is provided. This chamber is preferably in the form of a cylindrical tank provided with end heads 26 and 27 through which the steam feed pipe 18 extends. The fuel tube 23 is connected with this chamber and is provided with a cock 28 for regulating the supply of fuel to the mixing chamber. A fuel supply pipe 29, having a cut off valve 30, is also connected with the chamber 25 through which the chamber is kept full of fuel under pressure either by a gravity feed or by the use of pumps (not shown). A drain cock 31 is preferably provided at the bottom of the chamber through which sediment and other impurities in the fuel may be withdrawn.

In operation, the throttle valve 16 is opened and steam is admitted from the supply pipe 15 to the feed pipe 18 and thence through the T fitting 19 and elbow 20 to the nozzle 12 from which it issues into and through the mixing chamber 10 in the form of a blast which sweeps past the adjacent end of tube 23 and branch 22. The hot steam passing through feed pipe 18 heats the fuel in the chamber 25 so that the fuel enters the tube 23 in a warm fluid condition. The cocks 28 and 30 are opened and liquid fuel issues from the tube 23 and is caught up by the steam and completely atomized.

At the same time, the velocity of the steam induces a flow of atmospheric air past the valve 24 and through the branch 22 into the mixing chamber, where it is thoroughly mixed with the atomized fuel and steam. This mixture passes on to the outer end of the burner pipe 11 where, upon ignition, it burns with a clean hot flame.

Various changes may be made in the embodiment of the invention above described without departing from or sacrificing any of the advantages of the invention as defined in the following claims.

I claim:

1. In an oil burner the combination of a tubular mixing chamber, an air passage arranged at an angle with said chamber and communicating therewith, a fuel pipe extending through said passage and substantially into said chamber and spaced from the walls thereof, and a nozzle at one end of said chamber for directing a blast of fluid through said chamber across the ends of said passage and pipe.

2. In an oil burner the combination of a tubular mixing chamber, a tubular air passage communicating therewith, a heating chamber, a fuel supply pipe connected with said chamber, a fuel delivery pipe leading from said heating chamber to said mixing chamber, and a nozzle at one end of said mixing chamber for directing a blast of fluid through said mixing chamber across the ends of said passage and fuel delivery pipe.

3. In an oil burner, the combination of a container for liquid fuel, means for supplying the container with fuel, a mixing chamber, a tubular air passage leading into said chamber, a pipe for containing heated gases for heating the fuel in said container, said pipe leading through said container to said mixing chamber, a nozzle connected with said pipe for directing a blast of heated gas through said chamber across the end of said passage, and a pipe for conveying liquid fuel from said container through said tubular passage and into said blast.

In witness whereof, I hereunto subscribe my name this 23 day of August, 1920.

JULIUS C. MISNER.